US012164056B2

(12) United States Patent
Nair et al.

(10) Patent No.: US 12,164,056 B2
(45) Date of Patent: Dec. 10, 2024

(54) CONTEXT BASED TARGET DETECTION

(71) Applicant: Infineon Technologies AG, Neubiberg (DE)

(72) Inventors: Ajayan Vijayakumaran Nair, Bath (GB); David Michael Addison, Bristol (GB); Markus Bichl, Feldkirchen-Westerham (DE); Moustafa Samy Abdelkhalek Ahmed Emara, Bristol (GB); Andre Roger, Munich (DE); Dyson Wilkes, Marlborough (GB)

( * ) Notice: Subject to any disclaimer, the term of this patent is extended or adjusted under 35 U.S.C. 154(b) by 526 days.

(21) Appl. No.: 17/512,984

(22) Filed: Oct. 28, 2021

(65) Prior Publication Data

US 2023/0138972 A1    May 4, 2023

(51) Int. Cl.
*G01S 7/35*    (2006.01)

(52) U.S. Cl.
CPC .................... *G01S 7/354* (2013.01)

(58) Field of Classification Search
USPC ........................................................ 342/147
See application file for complete search history.

(56) References Cited

U.S. PATENT DOCUMENTS

| | | | |
|---|---|---|---|
| 9,632,173 B2 | 4/2017 | Ygnace | |
| 2022/0120855 A1* | 4/2022 | Rosu | G01S 13/34 |

OTHER PUBLICATIONS

F. Wu, N. Wu and M. Wu, A fast and slow time combined CFAR detection algorithm used in through-the-wall radar, 2017, 2017 IEEE Electrical Design of Advanced Packaging and Systems Symposium (EDAPS), pp. 1-3 (Year: 2017).*
M. Kronauge and H. Rohling, Fast Two-Dimensional CFAR Procedure, Jul. 2013, IEEE Transactions on Aerospace and Electronic Systems, vol. 49 No. 3, pp. 1817-1823 (Year: 2013).*
Klilou, Abdessamad et al.; "Real-time parallel implementation of Pulse-Doppler radar signal processing chain on a massively parallel machine based on multi-core DSP and Serial RapidIO interconnect"; EURASIP Journal on Advances in Signal Processing; 2014.
Parker, Michael; "Radar basics—Part 1"; EE Times; Altera Corporation; May 17, 2011.
Parker, Michael; "Radar basics—Part 2: Pulse Doppler Radar"; EE Times; Altera Corporation; May 28, 2011.

(Continued)

*Primary Examiner* — Peter M Bythrow
*Assistant Examiner* — Eric K Hodac
(74) *Attorney, Agent, or Firm* — Eschweiler & Potashnik, LLC (57) ABSTRACT

In some methods, sampled values based on a reception signal are stored in rows and columns of a memory array. A first 1-dimensional (1D) detector is moved in a first direction over the memory array. The first 1D detector includes a first cell under test and first and second training cells on opposite sides of the first cell under test. The first cell under test and the first and second training cells of the first 1D detector being aligned in the first direction. A second 1D detector is moved over the memory array. The second 1D detector includes a second cell under test and third and fourth training cells on opposite sides of the second cell under test. The second cell under test and the third and fourth training cells of the second 1D detector are aligned in a second direction that is perpendicular to the first direction.

14 Claims, 8 Drawing Sheets

(56) References Cited

OTHER PUBLICATIONS

Parker, Michael; "Radar basics—Part 3: Beamforming and radar digital processing"; EE Times; Altera Corporation; Jun. 10, 2011.
Parker, Michael; "Radar basics—Part 4: Space-time adaptive processing"; EE Times; Altera Corporation; Jun. 28, 2011.
Parker, Michael; "Radar basics—Part 5: synthetic aperture radar"; EE Times; Altera Corporation; Jul. 18, 2011.

* cited by examiner

Time T1

FIG. 9A

Time T2

FIG. 9B

Time T3

FIG. 9C

Time T4

FIG. 9D

Time T5

FIG. 9E

Time T6

FIG. 9F

Time T7

FIG. 9G

Time T8

CONTEXT BASED TARGET DETECTION

FIELD

The present disclosure relates in general to electronic systems such as radar systems, and more particularly, to radar systems that utilize constant false alarm rate (CFAR) or other detection techniques.

BACKGROUND

Radar (RAdio Detection And Ranging) systems use radio waves to determine the location and/or velocity of targets in a field. Historically, radar has been used to detect aircraft, ships, spacecraft, guided missiles, and terrain, among others. In more recent times, radar has also been used to study and/or predict weather formations, and has been used in collision-detection and/or collision-avoidance in motor vehicles. A radar system includes a transmitter to produce electromagnetic waves in the radio or microwave domain, a receiver to receive those waves after they bounce back from one or more targets in a field, and a processor to determine properties of the targets. The electromagnetic waves from the transmitter can be pulsed or continuous, and reflect off the target and return to the receiver, giving information about the target's location and/or velocity relative to the radar system.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware.

Figure 1:
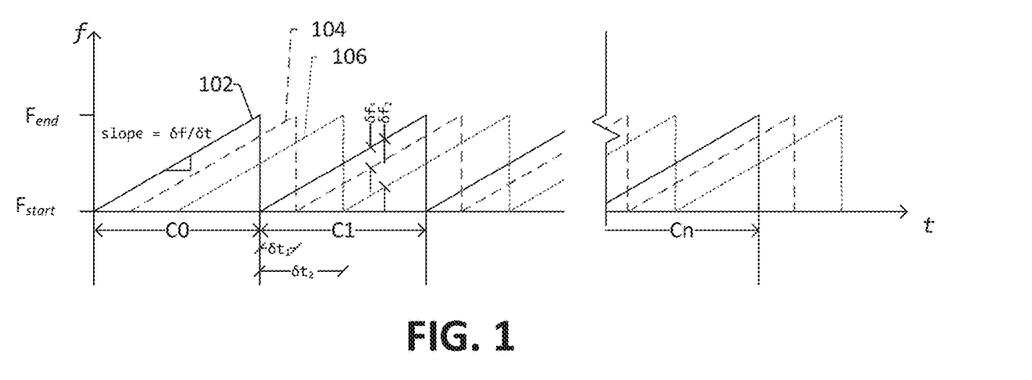
FIG. 1 illustrates a transmitted waveform and received waveforms used in a frequency modulated continuous wave (FMCW) radar system.

Radar systems transmit electromagnetic waves in the form of discrete pulses or continuous waves, and then listen for received pulses (or echoes) to determine the location and/or velocities of targets in a field. For example, FIG. 1 shows an example of a simple transmitted waveform 102 transmitted by a frequency modulated continuous wave (FMCW) radar system, and two received waveforms (or echoes) 104, 106 that reflect back from various targets in the field. It will be appreciated that these waveforms are merely non-limiting examples, and actual waveforms can take any number of forms.

Figure 2:
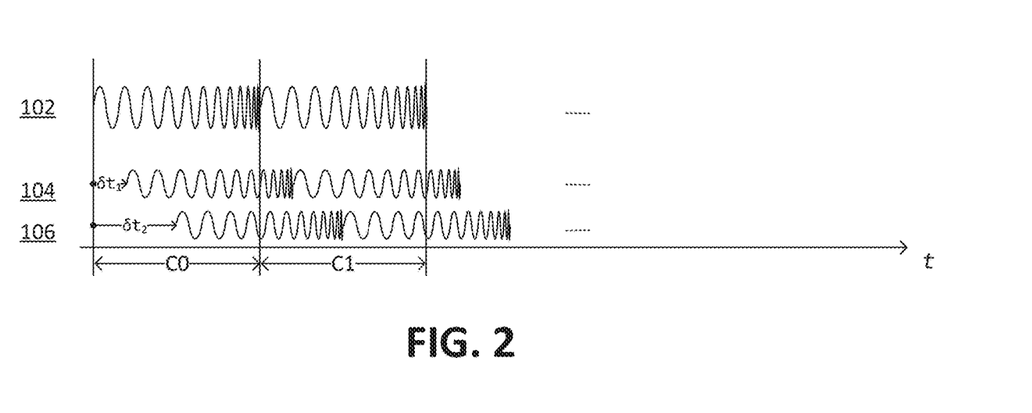
FIG. 2 illustrates a transmitted pulse and received pulses used in a FMCW radar system.

The transmitted waveform 102 includes a series of ramps or chirps, which are transmitted so as to be repeated at regularly spaced time windows C0, C1, C2, . . . , Cn. FIG. 1 shows the instantaneous frequency of the chirps versus time, while FIG. 2 shows the corresponding modulated voltage signals of the chirps as they are transmitted in the corresponding time windows C0, C1, . . . . Each ramp starts at the beginning of a given time window at a start frequency $F_{start}$ and ramps up or down to an end frequency Fend at the end of the given time window. Ideally, each ramp has a constant slope during that time window, which provides a link between time delay, beat frequency, and range for various targets in the FMCW radar system. In actual implementations, the slope may not be perfectly constant and may vary slightly in time.

The received waveforms 104, 106 or "echoes" are in response to the transmitted waveform 102. The received waveforms 104, 106 are time delayed copies of the transmitted waveform 102 and also carry a Doppler component due to the relative velocity of the target from which they reflect. Thus, for example, in FIG. 1 and FIG. 2, the first received waveform 104 is reflected from a first target at range 1 and is delayed relative to the transmitted pulse by a first delay, δt1 for the first time window C0. Similarly, the second received waveform 106 is reflected from a second target at range 2 and delayed relative to the transmitted waveform 102 by a second delay, δt2 for the first time window C0. Because these time delays δt1, δt2 represent the roundtrip delay from the transceiver to the first and second targets in the field, these time delays form the basis of determining the first and second ranges to the first and second targets, respectively. Further, for later time windows, if the first target is moving, the delay between the transmitted waveform 102 and the first received waveform 104 may change slightly (relative to the first delay, δt1), and this can evidence the velocity of the first target. Note that, relative to the duration of a given time window, the lengths of the first and second time delays δt1, δt2 are exaggerated in FIG. 1 and FIG. 2 for purposes of clarity of understanding.

Figure 3:
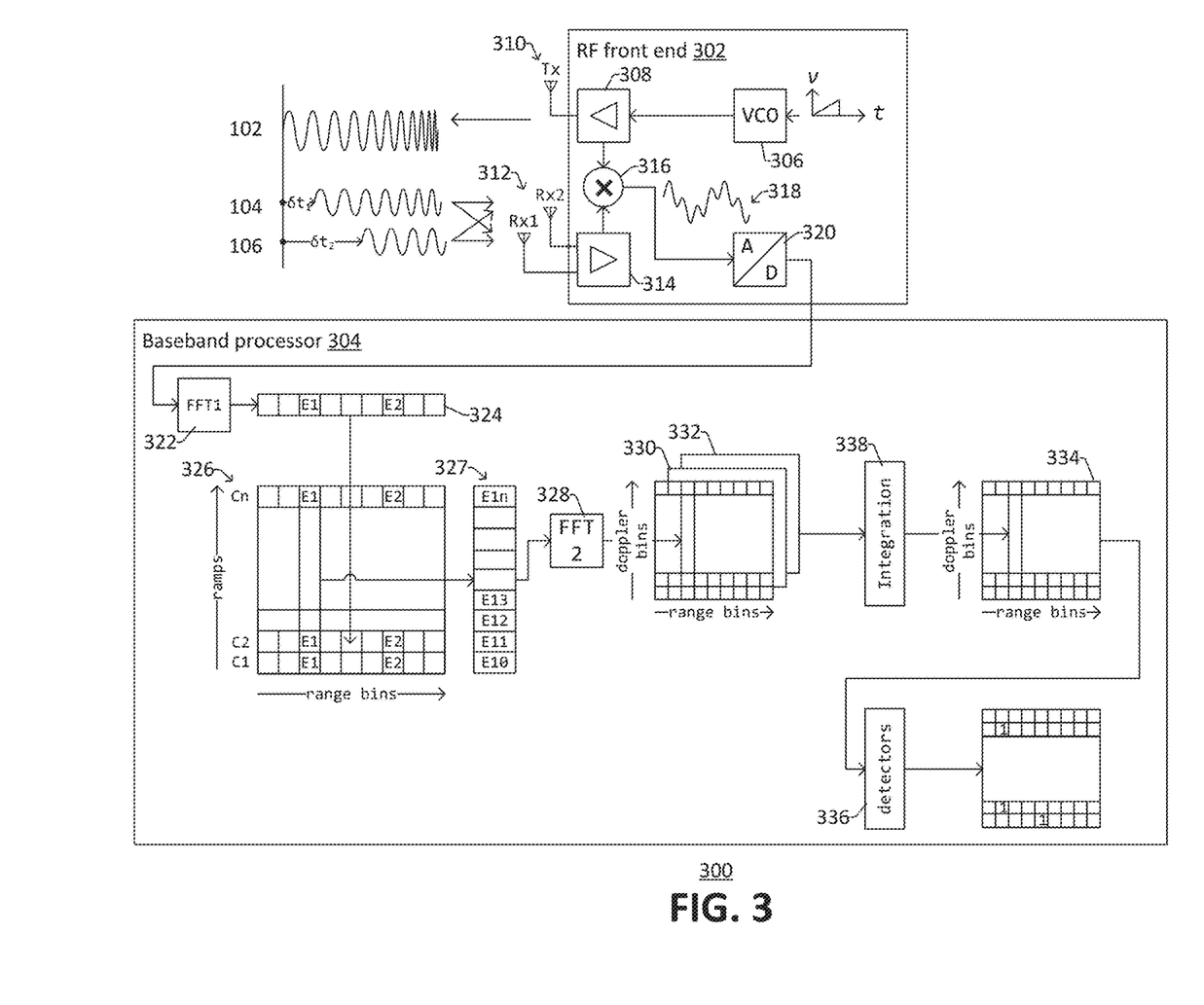
FIG. 3 illustrates a FMCW radar system.

FIG. 3 illustrates a FMCW radar transceiver 300 in accordance with some embodiments, and which can make use of FMCW waveforms such as described in FIGS. 1-2. The transceiver 300 includes a radio frequency (RF) front end 302 and a baseband processor 304 downstream of the RF front end 302. The RF front end 302 includes a transmitter (which includes a voltage controlled oscillator 306, amplifier 308, and transmission antenna 310) and a receiver, which includes one or more reception antenna(s) 312. The transmitter generates a transmitted waveform 102 for example using the VCO 306. In the illustrated example, the transmitted waveform 102 has a frequency that ramps in time for n ramps transmitted in n time windows, respectively. The transmitted waveform is achieved by performing a frequency modulation of a carrier frequency, Fc. The instantaneous frequency of the transmitted waveform 102 can now vary from Fstart to Fend. The transmitter transmits the waveform 102 using the amplifier 308 and antenna 310.

The received waveforms or "echoes" (e.g., 104 and 106) are received by the receiving antenna(s) 312 and an amplifier 314. Because each target in the field generates a different echo, each Rx antenna 312 sees a superposition of all received waveforms. A mixer 316 mixes the transmitted waveform 102 and the received waveforms 104, 106 and thereby multiplies these waveforms together to provide a mixed signal 318. This mixed signal 318 includes a beat frequency, which is a mixture of the frequencies $\delta f1 + \delta f2$ of the received waveforms. Thus, this beat frequency corresponds to time delays for the various targets, and wherein these time delays correspond to the ranges to the various targets, respectively. The beat frequency is much less than the carrier frequency, Fc; or the central frequency of the sweep. The beat frequency is then sampled by an analog-to-digital converter (ADC) 320 to generate a digital signal.

In the baseband processor 304, a first Fast-Fourier transform (FFT) block 322 processes the digital signal and separates the individual beat frequencies. This directly leads to range bins 324, with each range bin corresponding to a different range of ranges/distances in which targets can be found. The process is repeated over every ramp of n ramps, so the range bins are stored for each of n ramps. When all the n ramps are complete, a block of data is stored in a memory array 326. The results in range bin @E1 327 (which includes a range value for Range E1 for each of the n ramps) may look similar at this stage but, since the individual ramps C1, C2, ..., Cn are separated in time, the samples carry a subtle phase difference induced by the Doppler shift of the various targets (e.g., a time delay due to a slight change in range for a target caused by the target moving by distance v*t, where v is the velocity of the target and t is time).

To recover Doppler information, a second FFT block 328, this time on the co located bins (represents the corner turn or transpose operation) from all ramps can now be used.

In 330 and 332, two stage processing now yields the familiar Range Doppler map. Practical radars often have more than 1 antenna. This provides some diversity. Each antenna is processed in a similar fashion, almost concurrently.

In 334, the diversity from multiple antennas is combined using integration 338, and the output of this process is the power levels that are used in the detection process, as will be described in FIG. 4. Then, in 336, multiple 1-dimensional detectors perform processing to determine whether the detected power levels represent actual targets or phantom targets, as will be described in later figures.

Figure 4:
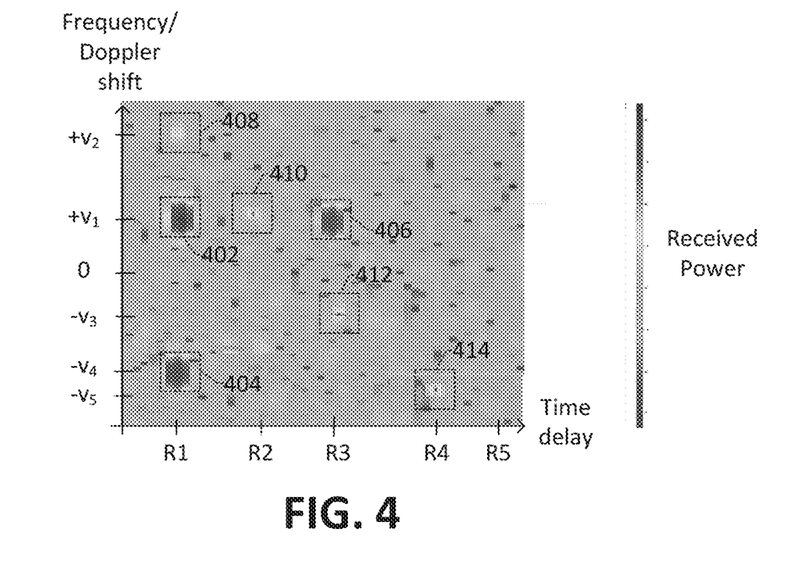
FIG. 4 illustrates a 2D plot illustrating a field with received power from various targets plotted against time delay (Range) and frequency/Doppler shift (relative velocity) in a radar system.

FIG. 4 illustrates a 2-dimensional plot of Range (x axis) and Doppler shift (y-axis) over a field of the radar system. The color coding on the plot indicates the power of the received signal pulse at each range value and Doppler shift value. Thus, after one or more pulses are transmitted, the received power for various time delays is plotted on the x-axis according to Range bins. At each range bin, the transceiver applies Doppler filtering to determine Doppler frequency shift on each range bin. For instance, in FIG. 4, there are several regions of increased received power, which correspond to potential targets in the viewing area. A first potential target 402 is located at Range R1 having relative velocity +v1; a second potential target 404 is located at Range R1 having relative velocity −v4; a third potential target 406 is located at Range R3 having relative velocity +v1. Other potential targets, which may be actual targets that are smaller and/or more difficult to detect can also be present, including a fourth potential target 408 located at Range R1 having relative velocity +v2; a fifth potential target 410 located at Range R2 having relative velocity +v1; a sixth potential target 412 located at Range R3 having relative velocity −v3; and a seventh potential target 414 located at Range R4 having relative velocity −v5.

Although these regions of increased received power are potential targets, due to a background of noise, clutter, and interference in the radar system, there is also a chance these regions of increased received power are merely phantom targets with no actual target present in those regions of the field. To help discern whether potential targets are actual targets or merely noise, radar systems may use Constant False Alarm Rate (CFAR) detection techniques.

A 2-dimensional (2D) CFAR detector is one type of detector that can be used to discern whether potential targets are actual targets or merely noise. A 2D CFAR detector includes a Cell Under Test (CUT), which is surrounded on all sides by a ring of guard cells, which are in turn surrounded by a ring of training cells. Thus, in FIG. 4, a 2D CFAR detector could confirm the presence of potential targets 402, 404, and 406, and 410, while dismissing potential targets 408, 412, and 414 as aberrations and/or phantom targets due to noise. Although 2D CFAR detectors are sufficient in many regards, 2D CFAR detectors are often expensive to implement.

Therefore, some aspects of the present disclosure make use of one or more 1-dimensional (1D) CFAR detector(s), which are generally less expensive than 2D CFAR detectors. The 1D CFAR detector(s) makes multiple passes over radar data stored in the system (and can correspond to detectors 336 in FIG. 3), with an initial pass giving a preliminary determination as to whether a potential target is an actual target and a subsequent pass giving a revised determination as to whether the potential target is an actual target. The revised determination is more accurate than the initial determination. Thus, the 1D CFAR detectors can approximate a "pseudo" 2D CFAR detector but at a much more affordable price point. In addition, it will be appreciated that although some aspects of the present disclosure are couched in terms of radar and 1-D CFAR detectors used in such radar, the present disclosure is also applicable more generally to other areas where data is stored in memory and then evaluated by one or more 1D detectors. Thus, in general, 1D detectors are not limited to 1D CFAR detectors and/or to use in radar applications, but are generally applicable to any type of 1D detector and/or other applications where incoming data is stored in memory and then processed. For example, although radar typically uses radio waves, the present disclosure could also be used in radar systems and/or wireless communication systems that use other portions of the electromagnetic spectrum besides radio and/or could be used in wireline systems, among others.

Figure 5:
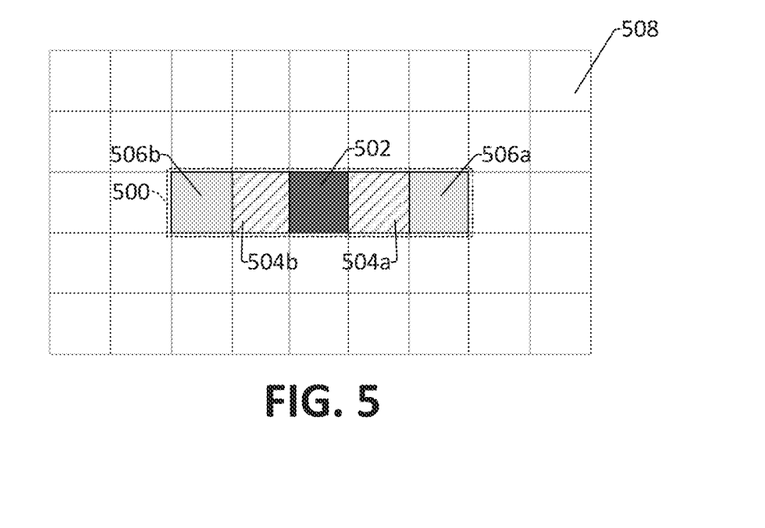
FIG. 5 illustrates a one-dimensional (1D) detector in accordance with some embodiments.

FIG. 5 illustrates an example of a 1D CFAR detector 500. The 1D CFAR detector 500 has a cell under test 502 with first and second guard cells 504a, 504b flanking opposite sides of the cell under test 502, and first and second training cells 506a, 506b in turn flanking outer sides of the first and second guard cells 504a, 504b, respectively. The first and second guard cells 504a, 504b and first and second training cells 506a, 506b extend in a single direction from the cell under test 502 without surrounding all sides of the cell under test 502. Such a 1D CFAR detector 500 can move over a memory array 508 to analyze values in the underlying memory cells to determine whether a memory cell(s) corresponding to the cell under test 502 has a value that is greater than an average value of memory cell(s) corresponding to the first and second training cells 506a, 506b. By using multiple passes of one or more 1 D-CFAR detectors over the memory array 508, some aspects of the present disclosure can be used in radar systems to process Range and Dopper data in ways that are efficient in terms of processing speed, while at the same time being cheaper to implement than a 2D CFAR detector. This is in part because the memory requirements for a 1D CFAR detector are less than those of a 2D CFAR detector, which enables these efficiencies.

Figure 6:
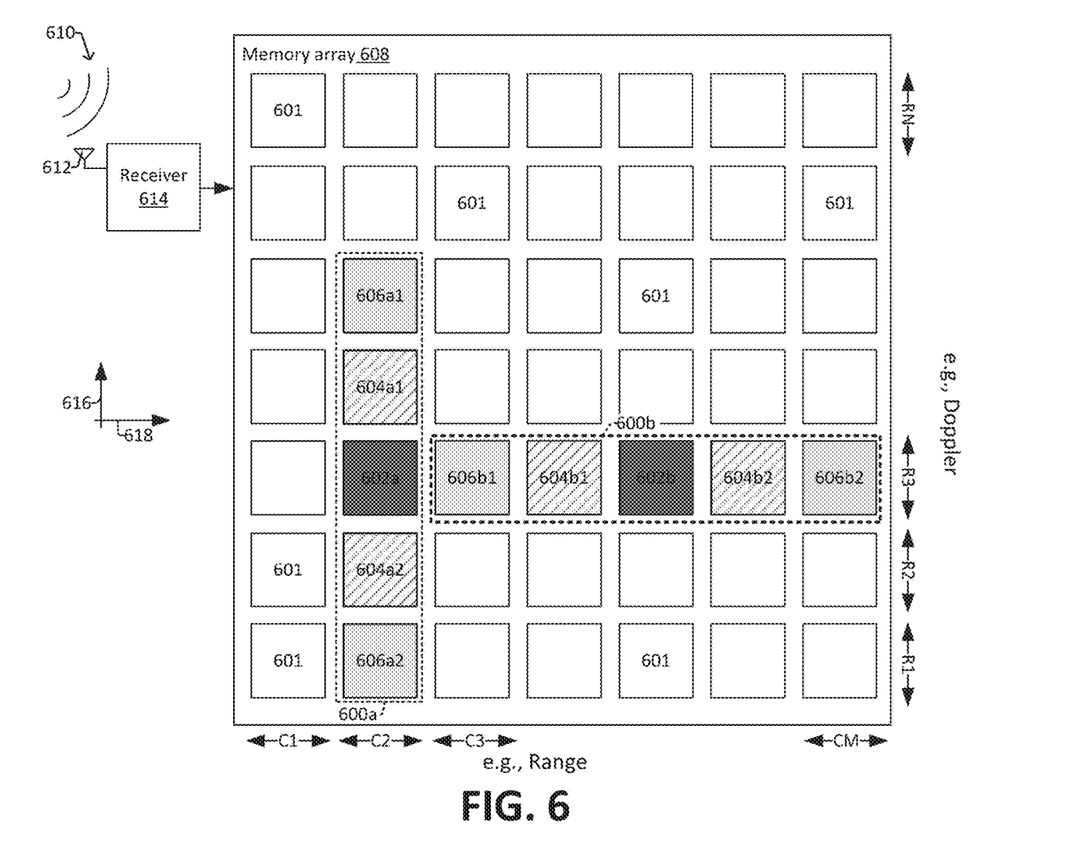
FIG. 6 illustrates a system including a receiver and a memory array with two 1D detectors that move in coordinated fashion to evaluate data in the memory array.

FIG. 6 shows an example of a system 600 where first and second 1D detectors 600a, 600b perform analysis on a memory array 608, which includes memory locations (e.g., some of which are labeled 601) arranged in rows and columns. The first and second 1D detectors 600a, 600b can each manifest as a 1D CFAR detector 500 such as shown in FIG. 5, but could also be other 1D detectors. In the example of FIG. 6, a reception signal 610 is received on an antenna 612 of a receiver 614. The reception signal 610 can based on an RF signal that is down-converted to baseband (and can for example be processed by a Fast Fourier transform), and the reception signal 610 can have different received power levels that vary in time. Sample values corresponding to the received power levels of the reception signal 610 are stored in N rows (e.g., R1, R2, . . . , RN) and M columns (e.g., C1, C2, . . . , CN) of the memory array 608. Thus, a first sample value indicative of a first received power level can be stored in row R1, column C1; a second sample value indicative of a second received power level can be stored in row R1, column C2; and so on.

A first 1D detector 600a and a second 1D detector 600b move over the memory array 608 to evaluate the sampled values stored the memory array 608 to thereby make determinations based on the sampled values. In some examples, the first 1D detector 600a and the second 1D detector 600b can move concurrently over the memory array 608 to make these determinations. In some embodiments with concurrent movement of the first and second 1D detectors, the first and second 1D detectors 600a, 600b can both follow the same travel path over the memory array, with one of the 1D detectors lagging the other 1D detector. However, in other examples, the first 1D detector 600a can move over the memory array 608 during a first time interval to perform its detections. Then, after the first 1D detector has completed its detections during the first time interval, the second 1D detector 600b can move over the memory array 608 to perform its detections in a second time interval. While in some instances the first and second 1D detectors can both follow the same travels paths, in other examples the first and second 1D detectors can travel different travel paths over the memory array.

Typically, the first 1D detector 600a includes a first cell under test 602a and first and second training cells 606a1, 606a2, which are oriented along a first direction 616 corresponding to a row of the memory array 608. The first and second training cells 606a1, 606a2 are on opposite sides of the first cell under test 602a, and can be separated by from the first cell under test 602a by first and second guard cells 604a1, 604a2, respectively. The first 1D detector 600a is moved in the first direction 616 over the memory array at some time during its movement. For each detection performed by the first 1D detector 600a, the first 1D detector stores a first bit value.

The second 1D detector 600b is also moved over the memory array 608, and can be moved in the first direction 616 and/or in a second direction 618 which is perpendicular to the first direction 616, depending on the implementation. The second 1D detector 600b includes a second cell under test 602b and third and fourth training cells 606b1, 606b2 on opposite sides of the second cell under test 602b, and can be separated by from the second cell under test 602a by third and fourth guard cells 604b1, 604b2, respectively. The second cell under test 602b and the third and fourth training cells 606b1, 606b2 of the second 1D detector 600b are aligned in a second direction 618 that is perpendicular to the first direction 616. For each detection performed by the second 1D detector 600b, the second 1D detector 600b can store a second bit value, and/or can revise the preliminary determination made by the first 1D detector to make a revised determination. This coordinated movement of the first and second 1D detectors 600a, 600b allows them to approximate a 2D detector in terms of detection accuracy, but at a much more affordable price point.

The first and second 1D detectors 600a, 600b can be implemented in hardware, software, etc. For example, in some cases the first and second 1D detectors 600a, 600b are implemented in a hardware module that receives the sampled values from the memory array 608 via a Direct Memory Access (DMA) hardware module coupled to the memory array 608 via a bus. In other cases, the first and second 1D detectors can be implemented in whole or in part by software instructions that are stored in memory and executed by a microprocessor or other controller.

Further, although FIG. 6 shows the memory array 608 as square (M=N), in other cases M and N could be different and the memory array 608 can be any size. Further the first 1D detector may be a single detector or a collection of different types of 1D detectors; and/or the second 1D detector may be a single detector or a collection of different types of 1D detectors. The results from one, many, or any of the first and second 1D detectors can be used to produce preliminary determinations and/or revised determinations. The first and second 1D detectors can be of different types, and/or the first and second 1D detectors can be of different lengths and/or can have different numbers of guard cells and/or training cells. The first and second 1D detectors may operate in different domains (e.g., the first 1D detector can operate in a logarithmic domain while the second 1D detector can operate in a linear domain, or vice versa). The first and second 1D detectors may operate on sampled values of the same type or a different type. For instance, for area power optimization, one 1D detector could use high resolution samples and the other 1D detector could use a low resolution sample. For example, the first 1D detector can use 32 bit sampled values, and the second 1D detector can use rounded down 8 bit sampled values in some cases. Further still, in some cases, the first and second 1D detectors may use different thresholds for detection.

Figure 7:
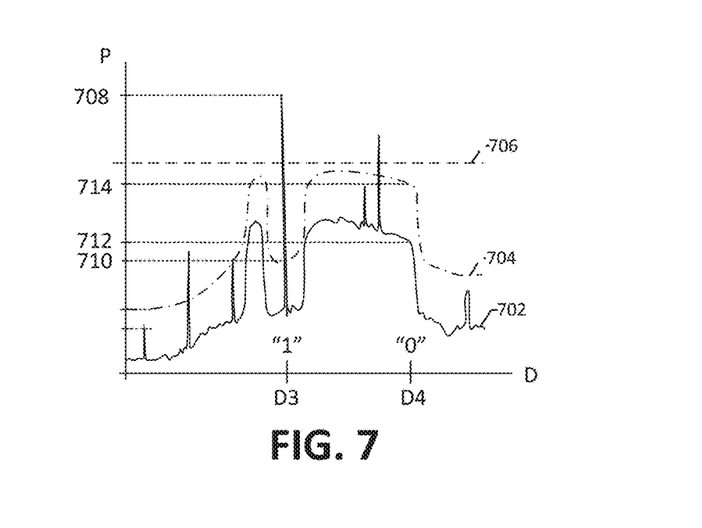
FIG. 7 illustrates a graph depicting an example of how a Constant False Alarm Rate (CFAR) detector can provide a determination of whether a target is present.

FIG. 7 depicts an example of how the first 1D detector 600a of FIG. 6 can carry out CFAR detection. The second 1D detector 600b can also operate similarly in some examples. As the first 1D detector 600a moves over the array, the first 1D detector 600a analyzes the received power level as measured at the first cell under test 602a for various Range bins and Doppler bins (as represented by waveform 702), and compares the received power level for the first cell under test to a first threshold corresponding to an average received power level stored in the first and second training cells 606*a*1, 606*a*2 (represented by 704 in FIG. 7). The first 1D detector 600*a* can also compare the received power level as measured at the first cell under test 602*a* to a fixed threshold corresponding to a predetermined value (represented by 706 in FIG. 7). As an example, if the plot of FIG. 7 corresponds to a "slice" of the memory array 608 corresponding to column 2 (C2) of FIG. 6, then the various Doppler bins (Rows of FIG. 6) extend along the x-axis of FIG. 7. Hence, in such an example, when the first cell under test 602*a* corresponds to a first memory location C2, R3, the first cell under test 602*a* measures a first received power level of 708, and the first and second training cells 606*a*1, 606*a*2 correspond to memory locations C2, R1 and C2, R5, respectively, and measure a first average received power level (plus some additional fixed margin) of 710. Because the first received power level of the first cell under test 708 is greater than the first average received power level 710, the first 1D detector outputs a single bit of "1" representing a first preliminary determination that an actual target is likely present at the Range and Doppler shift corresponding to C2, R3. Further in such an example, when the first cell under test 602*a* moves to correspond to C2, R4, the first cell under test 602*a* measures a second received power level of 712, and the first and second training cells 606*a*1, 606*a*2 correspond to memory locations C2, R2 and C2, R6, respectively measure a second average received power level (plus some additional fixed margin) of 714. Because the second received power level 712 is less than the second average received power level 714, the first 1D detector outputs a single bit of "0" representing a second preliminary determination that no actual target is present at the Range and Doppler shift corresponding to C2, R4.

Turning now to FIGS. 8 and 9A-9H, one can see some embodiments of a radar system 800 and corresponding techniques for target detection using first and second 1D CFAR detectors 810*a*, 810*b*. As can be seen from FIG. 8, the radar system 800 includes a signal generator 802 and a transmitter 804 including a transmit antenna 806, as well as a receiver 814 including a receive antenna 811. Typically, the receive antenna 811 and the transmit antenna 806 are physically distinct, but in other cases they can also be the same antenna.

Figure 8:
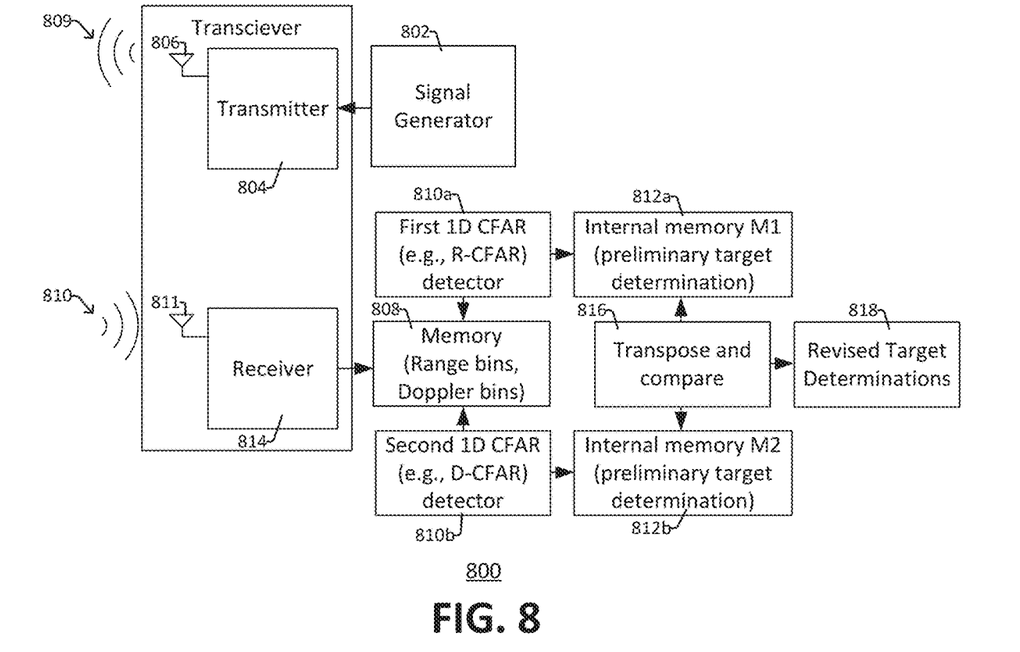
FIG. 8 illustrates a radar system that includes two 1D detectors in accordance with some embodiments.

During operation, the transmitter 804 uses the transmit antenna 806 to transmit a transmission signal 809 over a field that includes one or more targets. The transmission signal 809 reflects off one or more of the targets, and is received back at the receive antenna 811 of the receiver 814 as a reception signal 810 having a time delay and/or frequency/Doppler shift relative to the transmission signal 809. The time delay is indicative of the Range of the one or more targets, while the frequency/Doppler shift is indicative of the relative velocity of the one or more targets. The reception signal 810 has a time-varying received power, and is sampled in time by the receiver 814 so processed sample values are stored in memory array 808. Typically, the sampled values are stored in the memory array 808 according to Range bins (columns) and Doppler bins (rows), though in other examples the Range bins could be rows of the memory array and the Doppler bins could correspond to columns of the memory array 808.

A first 1D CFAR detector 810*a* and a second 1D CFAR detector 810*b* analyze the stored samples in the memory array 808 and store first and second preliminary target determinations, respectively, in first and second internal memories 812*a*, 812*b*, respectively. The preliminary target determinations relate to whether the first and second 1D CFAR detectors 810*a*, 810*b* make a preliminary determination a target is present at a given range and Doppler shift, and each preliminary determination is represented as a single bit per detector in the first and second internal memories 812*a*, 812*b* to reduce memory requirements of the radar system 800. In some cases, each 1D detector can include multiple detectors, and all of the detectors for a given 1D detector can be consolidated into a single bit. A transpose and compare block 816 then transposes the bits of one of the first and second internal memories 812*a*, 812*b* while leaving the bits of the other of the first and second internal memories 812*a*, 812 un-transposed. The transpose and compare block 816 then bitwise compares images of the transposed internal memory with the un-transposed internal memory to provide revised target determinations at 818. These revised target determinations 818 can confirm whether actual targets are present at the various range bins and Doppler bins corresponding to some preliminary target determinations, while discarding other preliminary target determinations as phantom targets that are not actual targets at other range bins and Doppler bins. The revised target determinations 818 have a higher accuracy for correct target detection than the preliminary target determinations. Thus, the use of the first and second 1D CFAR detectors 810*a*, 810*b* provides good reliability for the radar system 800, and is generally less expensive than a single 2D CFAR detector.

FIGS. 9A-9H provide a more detailed example of how FIG. 8's radar system 800 functions. FIG. 9A-9H generally illustrate various times for the memory array 808, the first internal memory 812*a*, and second internal memory 812*b*, as well as a 2-D plot 904 indicating whether predetermined targets, confirmed targets, and/or phantom targets are determined to be present in the field.

Figure 9A:
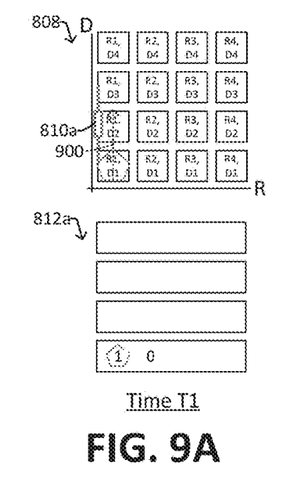
FIGS. 9A-9H illustrate some examples of CFAR radar techniques that use first and second 1D CFAR detectors to determine whether an actual target is present in the radar field in accordance with FIG. 8's radar system.
Figure 9B:
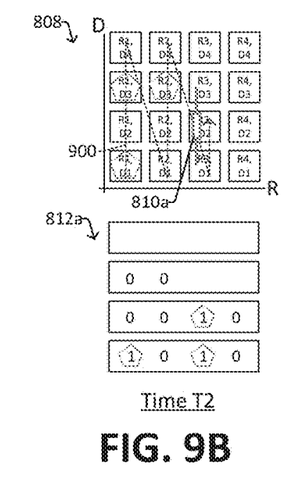
Figure 9C:
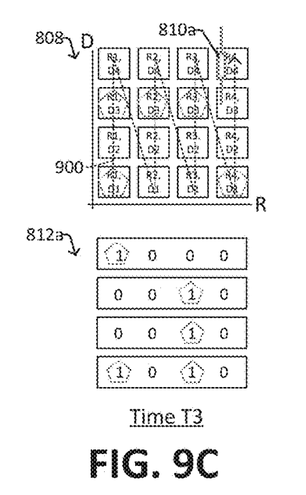

More particularly, FIG. 9A shows the radar system at time T1, wherein sampled values are stored in the memory array 808 according to Range bins (rows) and Doppler/frequency shift bins (columns). Each of these sampled values can be multiple bits in length, such as 8 bits in length, 16 bits in length, 32 bits in length, or another length. In some examples, each column of the memory array 808 can correspond to a constant range bin value, and the range bin values can increase or decrease as you move left to right over the memory array (e.g., all memory locations in column 1 can correspond to a first range bin value R1 of 150 m, all memory locations in column 2 can correspond to a second range bin value R2 of 100 m, and all memory locations in column 3 can correspond to a third range bin value R3 of 50 m, and so on). Similarly, each row of the memory array 808 can correspond to a constant Doppler shift bin value, and the Doppler shift bin values can increase or decrease as you move up or down over the memory array (e.g., all memory locations in row 1 can correspond to a first Doppler shift bin value D1 of −300 m/s), all memory locations in row 2 can correspond to a second Doppler shift bin value D2 of −200 m/s, and all memory locations in row 3 can correspond to a third Doppler shift bin value D3 of −100 m/s, and so on).

When the sampled values are stored in the memory array 808, the first 1D CFAR detector 810*a* moves over the memory array 808 according to a first travel path 900 during a first time interval (e.g., T1-T3). Thus, at time T1 in FIG. 9A, the first 1D CFAR detector 810*a*, which is oriented in a first direction corresponding to a column of the memory array, has traveled over two memory locations along the first travel path 900 and has used a CFAR algorithm (e.g., as previously described with regards to FIG. 7) to determine a first preliminary target is present at R1, D1 and no preliminary target is present at R1, D2, and corresponding first bits are stored in the first internal memory 812a. At time T2 in FIG. 9B, the first 1D CFAR detector 810a has progressed along two and a half columns of the first travel path 900 and has used the CFAR algorithm to make first preliminary target determinations for each memory location, and has stored first bits for each memory location in the first internal memory 812a. Thus, in this example, logical "1" represents Range/Doppler bins where a first preliminary target determination indicates a potential target is present (also indicated by pentagons for conceptual purposes), and logical "0" represents Range/Doppler bins where no potential target is present. At time T3 in FIG. 9C, the first 1D CFAR detector 810a has completed its travel along the first travel path 900 and has used the CFAR algorithm to make first preliminary target determinations for each memory location, and has stored first bits for each memory location in the first internal memory 812a. Thus, the bits in the first internal memory 812a are a compressed representation indicating whether potential targets are present at the various Range and Doppler bins.

Figure 9D:
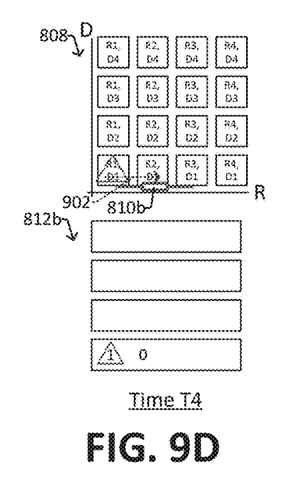
Figure 9E:
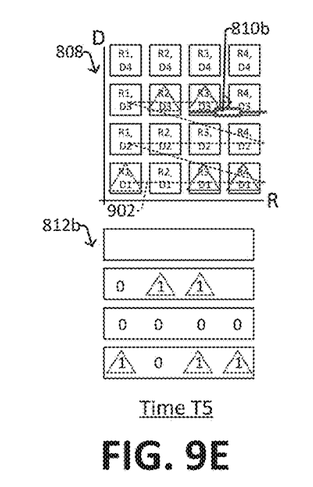
Figure 9F:
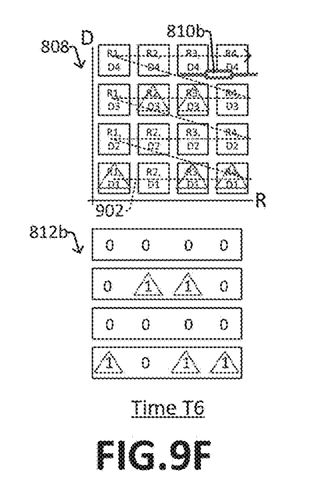

Next, in FIGS. 9D-9F during a second time interval (e.g., times T4-T6), which is non-overlapping with the first time interval, the second 1D CFAR detector 810b moves over the memory array 808 according to a second travel path 902 which is different from the first travel path 900. The second 1D CFAR detector 810b is oriented in a second direction corresponding to a row of the memory array and is perpendicular to the orientation of the first 1D CFAR detector. At time T4 in FIG. 9D, the second 1D CFAR detector 810b has traveled over two memory locations along the second travel path 902 and has used a CFAR algorithm to determine a second preliminary target is present at R1, D1 and no target is present at R2, D1, and corresponding second bits are stored in the second internal memory 812b. At time T5 in FIG. 9E, the second 1D CFAR detector 810b has progressed along three rows of the second travel path 902 and has used the CFAR algorithm to make second preliminary target determinations for each memory location on the second travel path 902, and has stored second bits for each memory location in the second internal memory 812b. At time T6 in FIG. 9F, the second 1D CFAR detector 810b has completed its travel along the second travel path 902 and has used the CFAR algorithm to make second preliminary target determinations for each memory location, and has stored second bits for each memory location in the second internal memory 812b.

Figure 9G:
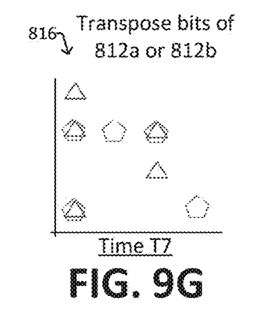

Notably, because the first travel path 900 is different from the second travel path 902, the image of the bits in the first and second internal memories 812a, 812b are transposed with respect to the Range bins and Doppler bins. In order to compare the stored bits to provide revised determinations based on the first and second preliminary determinations of whether a target is present, the transpose and compare block 816 transposes the bits in one of the first internal memory 812a and second internal memory 812b. For example, as shown in FIG. 9G, the bits in the second internal memory 812b can be transposed so the image 816 in both the first and second internal memories 812a, 812b is aligned in terms of detection for the various Range bins and Doppler bins. For conceptual purposes, note the triangle symbols corresponding to second bits in the second internal memory 812b are transposed in FIG. 9G, while the pentagon symbols corresponding to first bits in the first internal memory 812a remain un-transposed.

Figure 9H:
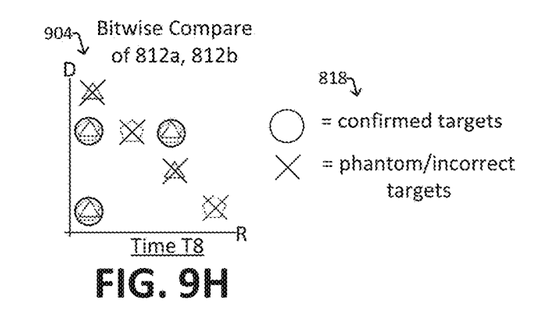

Lastly, in FIG. 9H, at time T8, a bitwise compare is performed on the memory image 816 of FIG. 9G to provide a revised determination of what the preliminary determinations are correct. Thus, in cases where the bits stored in the various bit locations are the same for the first internal memory and the transposed second internal memory (e.g., both have a "1" in R1, D1; R1, D4; R3, D2; and R3, D3 locations), actual targets are confirmed for those Ranges and Doppler shifts. However, if only one of the bit locations has a positive preliminary determination and the other does not (e.g., R1, D3 and R3, D1 locations), then the revised determination for that Range bin and Doppler bin is that no actual target is present, merely a phantom/incorrect target.

Figure 10:
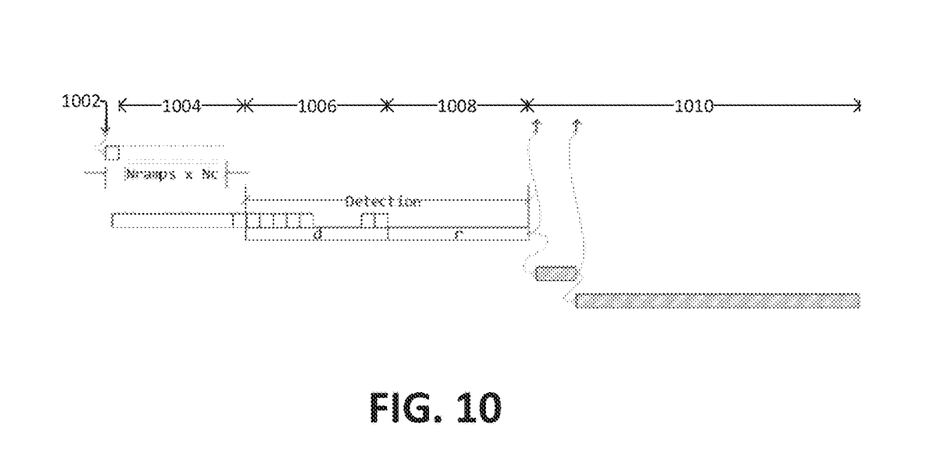
FIG. 10 illustrates a timing diagram illustrating processing of sampled values consistent with some aspects of FIG. 8 and FIGS. 9A-9G.

FIG. 10 shows a timing waveform diagram that is generally consistent with FIGS. 8 and 9A-9H where the transceiver transmits and receives radio waves during an initial time interval 1002, then the received signal is processed by a fast Fourier transform block and saved as sampled values in the memory array (1004). Next, during a first time interval 1006, the first 1D detector passes along columns of the memory array, and for each Doppler bin and Range bin outputs a first bit(s) value that corresponds to a first preliminary determination of whether the target is present at that Range bin and Doppler bin. These first bit values are stored in a first internal memory in the radar system. Then, during a second time interval 1008, the second 1D detector then passes along rows of the memory array, and for each Range bin and Doppler bin outputs a second bit value that corresponds to a second preliminary determination of whether the target is present at that Doppler bin and Range bin. These second bit values are stored in a second internal memory in the radar system. Then, during a third time interval 1010, the transpose and compare block then reads the first internal memory or the second internal memory to transpose bit of that memory, and a comparison takes place between for example, the first transposed internal memory and the second internal memory. Actual targets are confirmed where the bits of the first transposed internal memory and the second internal memory have matched images, while if the memory image does not match, then the targets are deemed phantom targets and not actual targets. Further processing, such as advanced Direction of Arrival (DoA), clustering, and target tracking, can also occur in the later portion of 1010.

Turning now to FIGS. 11, 12A-12E, and 13, one can see some embodiments of another radar system 1100 and corresponding techniques for target detection using first and second 1D CFAR detectors 1100a, 1100b. Compared to FIGS. 8-10, where the first and second 1D CFAR detectors 810a, 810b moved according to different travel paths over the memory array at non-overlapping times, in the radar system of FIGS. 11, 12A-12E and 13, the first and second 1D CFAR detectors 1100a, 1100b concurrently move over the memory array 808. Further, the first 1D CFAR detector 1100a moves over the memory array 808 according to a first travel path (see FIG. 12, 1200) over a first time interval, and the second 1D CFAR detector 1100b moves over the memory array 808 according to the first travel path over a second time interval that lags the first time interval. This approach results in reduced memory requirements and significantly faster processing times, compared to the radar system 800 of FIGS. 8-10.

Figure 11:
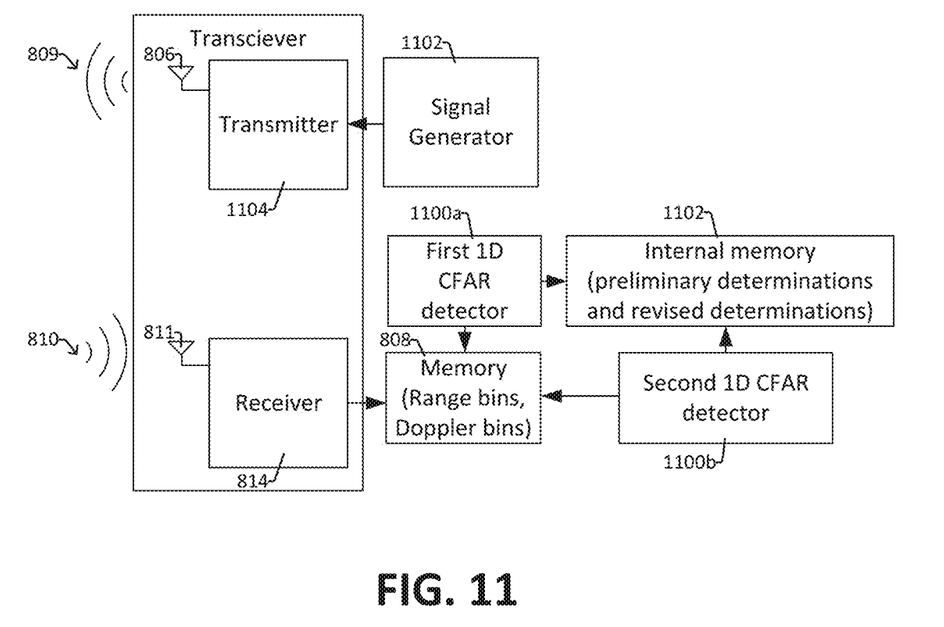
FIG. 11 illustrates a radar system that includes two 1D detectors in accordance with some embodiments.

As can be seen from FIG. 11, like the radar system 800 of FIG. 8, the radar system 1100 includes a signal generator 802 and a transmitter 804 including a transmit antenna 806, as well as a receiver 814 including a receive antenna 811. The transmitter and receiver operate as described with regards to FIG. 8, and store processed sampled values in the memory array 808 according to Range bins (columns) and Doppler bins (rows), as previously described. A first 1D CFAR detector 1100a, which is oriented in a first direction (e.g., along a first direction corresponding to a column of the array) moves along a first travel path over the first memory array, and analyzes the stored samples and stores first preliminary target determinations, respectively, as to the range and relative velocities of the targets in an internal memory 1102. Then the second 1D CFAR detector 1100b, which is oriented in a second direction perpendicular to the first direction, retraces the first travel path and re-evaluates the stored samples and revises the preliminary target determinations stored in the internal memory 1102. These revised target determinations can confirm whether actual targets are present various range bins and Doppler bins for some preliminary target determinations, while discarding other preliminary target determinations as phantom targets that are not actual targets at other range bins and Doppler bins. The revised target determinations have a higher accuracy for correct detection than the preliminary target determinations. Thus, the use of the first and second 1D CFAR detectors 1100a, 1100b provides good reliability for the radar system 1100.

FIGS. 12A-12E provide a more detailed example of how FIG. 11's radar system 1100 functions. FIG. 12A-12E generally illustrate the memory array 808, and the internal memory 1102 indicating whether predetermined targets, confirmed targets, and/or phantom targets are determined to be present in the field at various times.

Figure 12A:
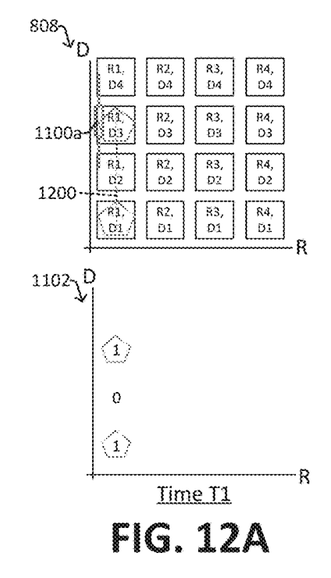
FIGS. 12A-12E illustrate some examples of CFAR radar techniques that use first and second 1D CFAR detectors to determine whether an actual target is present in the radar field in accordance with FIG. 11's radar system.

More particularly, FIG. 12A shows the radar system at time T1, wherein sampled values are stored in the memory according to Range bins (rows) and Doppler/frequency shift bins (columns). When the sampled values are stored in the memory array 808, the first 1D CFAR detector 1100a moves over the memory array 808 according to a first travel path 1200 during a first time interval (e.g., T1-T5). Thus, at time T1 in FIG. 12A, the first 1D CFAR detector, which is oriented in a first direction corresponding to a column of the memory array 808, has traveled over three memory locations along the first travel path 1200 and has used a CFAR algorithm to determine that a first preliminary target is present at R1, D1; no target is present at R1, D2; and a second preliminary target is present at R1, D3; and corresponding first bits are stored in the first internal memory. These first bits correspond to preliminary determinations that targets are likely to be present at R1, D1 and R1, D3.

Figure 12B:
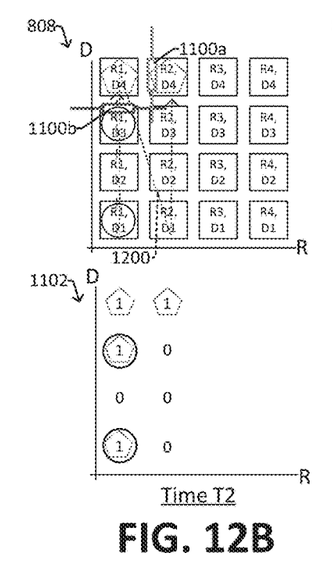

At time T2 in FIG. 12B, the first 1D CFAR detector 1100a has progressed along the second column of the first travel path 1200 and has made two additional preliminary determinations where targets are likely (at R1, D4; and R2, D4). Concurrently, the second 1D CFAR detector 1100b has started along the first travel path 1200, and has made revised determinations for the first three rows of the first column. In particular, the second 1D CFAR detector has run the CFAR algorithm (albeit in the second direction) and confirmed that actual targets are present for R1, D1, and R1, D3). Thus, the second detector leaves the "1" bits stored for these Range and Doppler locations at T2.

Figure 12C:
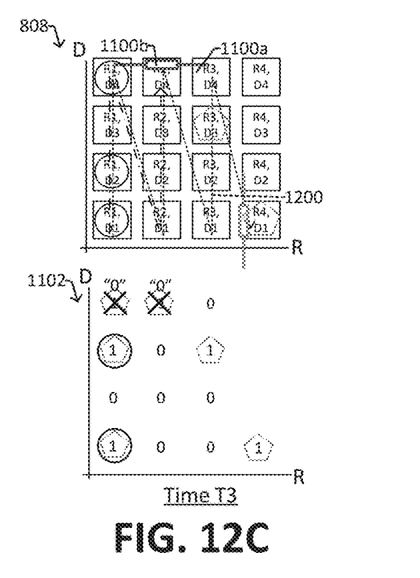

At time T3 in FIG. 12C, the first 1D CFAR detector 1100a has progressed further and is at the fourth column of the first travel path 1200 and has made additional preliminary determinations where targets are likely (at R3, D3 and R4, D1). Concurrently, the second 1D CFAR detector 1100b has progressed further along the first travel path 1200, and has made revised determinations for the remainder of the first column and the second column. In particular, the second 1D CFAR detector 1100b has run the CFAR algorithm, and the CFAR algorithm when run in the second direction has determined that actual targets are not present for R1, D4, or R2, D4. Therefore, the second 1D CFAR detector 1100b flips the "1" bits at these locations to "0" in the first internal memory 1102 "on the fly".

Figure 12D:
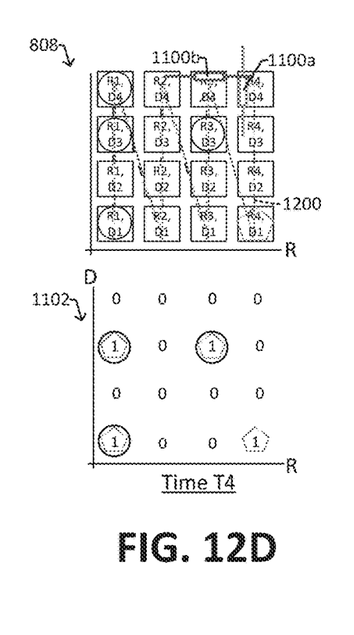

At time T4 in FIG. 12D, the first 1D CFAR detector 1100a has completed its analysis on the first travel path 1200, with the remainder of the fourth column having no additional preliminary determinations where targets are likely. Concurrently, the second 1D CFAR detector 1100b has progressed further along the first travel path 1200, and has made a revised determinations by confirming the preliminary determination at R3, D3. Thus, the second 1D CFAR detector leaves "1" at R3, D3.

Figure 12E:
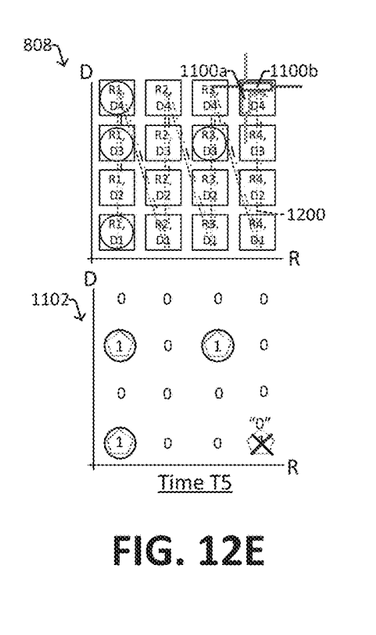

At time T5 in FIG. 12E, the second 1D CFAR detector 1100b has completed its analysis on the first travel path 1200. As shown in this example, the second 1D CFAR detector 1100b has made a revised determination that no actual target is present for R4, D1. Therefore, the second 1D CFAR detector 1100b flips the "1" bit at this locations in the internal memory 1102 to a "0" on the fly. The bit map illustrated in 1102 can then be plotted in a 2D plot for viewing, such as previously shown in FIG. 4 to show targets present in the field of the radar system in a dynamic manner.

Notably, because the first and second 1D CFAR detectors 1100a, 1100b each move over the same first travel path 1200, albeit lagged with regards to one another, the approach of FIGS. 12A-12E reduces the memory requirements for the radar system 1100 compared to the radar system 800 of FIG. 8. Further, this approach of FIGS. 12A-12E processes the samples faster than that of FIGS. 9A-9H, and thus is particularly advantageous.

Figure 13:
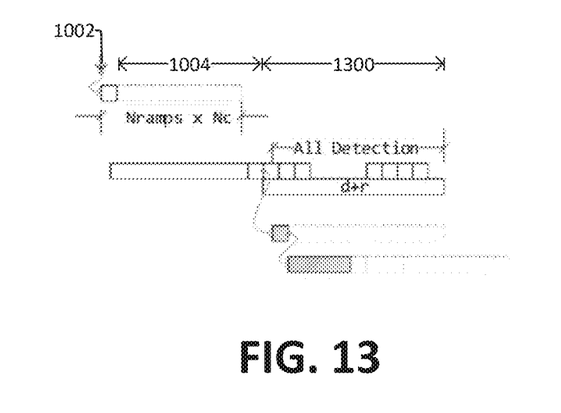
FIG. 13 illustrates a timing diagram illustrating processing of sampled values consistent with some aspects of FIG. 11 and FIGS. 12A-12E.

FIG. 13 shows a timing waveform diagram that is generally consistent with FIGS. 11 and 12A-12E. During an initial time interval 1002, the transceiver transmits and receives radio waves, and the received signal is processed by a fast Fourier transform block and saved as sampled values in the memory array. Next, during a first time interval 1300, the first and second 1D detectors concurrently move over the memory array and analyze the sampled values stored in the array. More particularly, for each Doppler bin and Range bin, the first 1D detector outputs a first bit value that corresponds to a first preliminary determination of whether the target is present at that Range bin and Doppler bin. These first bit values are stored in a first internal memory in the radar system. Then, still during the first time interval, as the second 1D detector moves over the array, the second 1D detector revises the first bit values and can change some preliminary determinations to revise them to indicate an actual target is not present for a given Range bin and Doppler bin. Again, this approach reduces the memory requirements for the radar system 1100 compared to the radar system 800 of FIG. 8; and processes the sampled values faster than that of FIG. 10, and thus is particularly advantageous.

In some disclosed methods, sampled values based on a reception signal are stored in rows and columns of a memory array. A first 1-dimensional (1D) detector is moved in a first direction over the memory array. The first 1D detector includes a first cell under test and first and second training cells on opposite sides of the first cell under test. The first cell under test and the first and second training cells of the first 1D detector being aligned in the first direction. A second 1D detector is moved over the memory array. The second 1D detector includes a second cell under test and third and fourth training cells on opposite sides of the second cell under test. The second cell under test and the third and fourth training cells of the second 1D detector are aligned in a second direction that is perpendicular to the first direction.

In some disclosed systems, a receiver is configured to receive a reception signal. A memory is coupled to the receiver and is configured to store sampled values from the receiver in rows and columns of the memory. A first 1-dimensional (1D) detector includes a first cell under test and a first training cell that are oriented along a first direction corresponding to a row of the memory. A second 1D detector includes a second cell under test and a second training cell that are oriented along a second direction corresponding to a column of the memory. The second direction is perpendicular to the first direction.

In some disclosed radar systems, a transmitter is configured to transmit a transmission signal, and a receiver is configured to receive a reception signal that is based on the transmission signal. A memory is coupled to the receiver and is configured to store radar samples according to range bins and Doppler bins. A first 1-dimensional constant false alarm rate (1D CFAR) detector is configured to provide a preliminary target determination based on the radar samples stored in the range bins and Doppler bins. A second 1D CFAR detector is configured to provide a revised target determination based on the preliminary target determination.

Further still, some examples of the present disclosure correspond to a method in which radar sampled values are stored in an array according to Range bins and Doppler bins. The Range bins corresponds to rows of the array and the Doppler bins correspond to columns of the array, or vice versa. A first 1-dimensional (1D) constant false alarm rate (1D CFAR) detector is moved to evaluate radar samples in a first direction along a first column of the array. The first 1D CFAR detector is oriented to have a first cell under test and a first guard cell that are aligned in the first direction. While the first 1D CFAR detector is moving along the first column of the array, a second 1D CFAR detector is concurrently moved to evaluate radar samples along a second column of the array. The second 1D CFAR detector is oriented to have a second cell under test and a second guard cell that are aligned in a second direction corresponding to a row of the array. The second direction is perpendicular to the first direction.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method, comprising:
   moving a first 1-dimensional (1D) detector in a first direction over a memory array, the first 1D detector including a first cell under test and first and second training cells on opposite sides of the first cell under test, the first cell under test and the first and second training cells of the first 1D detector being aligned in the first direction; and
   moving a second 1-dimensional (1D) detector over the memory array, the second 1D detector including a second cell under test and third and fourth training cells on opposite sides of the second cell under test, the second cell under test and the third and fourth training cells of the second 1D detector being aligned in a second direction that is perpendicular to the first direction,
   wherein the first and second 1D detectors are located at first and second locations, respectively, of the memory array at a given time, the first and second locations being different from one another, and
   wherein the first 1D detector moves over the first and second locations of the memory array according to a first travel path over a first time interval, and wherein the second 1D detector moves over the first and second locations of the memory array according to the first travel path over a second time interval that lags the first time interval.

2. The method of claim 1:
   wherein when the first 1D detector corresponds to the first location of the memory array during the first time interval, the first 1D detector provides a first comparison between a first received power level corresponding to the first cell under test and a second received power level corresponding to the first and second training cells; and
   wherein the first 1D detector provides a preliminary determination based on the first comparison.

3. The method of claim 2, further comprising:
   wherein when the second 1D detector corresponds to the first location of the memory array during the second time interval, the second 1D detector provides a second comparison between a third received power level corresponding to the second cell under test and a fourth received power level corresponding to the third and fourth training cells; and
   wherein the second 1D detector provides a revised determination based on the preliminary determination and the second comparison.

4. The method of claim 3, wherein the first 1D detector outputs a bit value to a first 1D detector memory, the bit value being a first state when a first sample value corresponding to the first cell under test is greater than a threshold value, the threshold value being based on the received power levels corresponding to the first and second training cells.

5. A method, comprising:
moving a first 1-dimensional (1D) detector in a first direction over a memory array, the first 1D detector including a first cell under test and first and second training cells on opposite sides of the first cell under test, the first cell under test and the first and second training cells of the first 1D detector being aligned in the first direction; and
moving a second 1-dimensional (1D) detector over the memory array, the second 1D detector including a second cell under test and third and fourth training cells on opposite sides of the second cell under test, the second cell under test and the third and fourth training cells of the second 1D detector being aligned in a second direction that is perpendicular to the first direction,
wherein the first and second 1D detectors are located at first and second locations, respectively, of the memory array at a given time, the first and second locations being different from one another, and
wherein the first 1D detector moves over the first and second locations of the memory array according to a first travel path during a first time interval, and wherein the second 1D detector moves over the first and second locations of the memory array according to a second travel path different from the first travel path over a second time interval that is non-overlapping with the first time interval.

6. The method of claim 5, wherein the first cell under test reads a first sample value from a first memory location at a first time, and wherein the second cell under test reads the first sample value from the first memory location at a second time, the second time being later than the first time.

7. A system, comprising:
a receiver configured to receive a reception signal;
a memory array coupled to the receiver and configured to store sampled values from the receiver in rows and columns of the memory array;
a first 1-dimensional (1D) detector including a first cell under test and a first training cell that are oriented along a first direction corresponding to a row; and
a second 1D detector including a second cell under test and a second training cell that are oriented along a second direction corresponding to a column, the second direction perpendicular to the first direction,
wherein the first 1D detector moves over different locations of the memory array according to a first travel path during a first time interval, and wherein the second 1D detector moves over the different locations of the memory array according to a second travel path different from the first travel path over a second time interval that is non-overlapping with the first time interval.

8. The system of claim 7, wherein the first and second 1D detectors are located at first and second locations, respectively, of the memory array at a given time, the first and second locations being different from one another.

9. A method, comprising:
storing radar samples in an array according to Range bins and Doppler bins, the Range bins corresponding to rows of the array and the Doppler bins corresponding to columns of the array, or vice versa;
moving a first 1-dimensional (1D) constant false alarm rate (1D CFAR) detector to evaluate radar samples in a first direction along a first column of the array according to a first travel path, wherein the first 1D CFAR detector is located at a first location of the array at a given time, and is oriented to have include a first cell under test and a first training cell that are aligned in the first direction; and
moving a second 1D CFAR detector to evaluate radar samples along a second column of the array according to a second travel path that differs from the first travel path, wherein the second 1D CFAR detector is located at a second location of the array at the given time, and is oriented to include a second cell under test and a second training cell that are aligned in a second direction corresponding to a row of the array, the second direction being perpendicular to the first direction and the second location being different from the first location.

10. The method of claim 9:
wherein the first 1D CFAR detector makes a preliminary determination at a first time of whether a target is present at an intersection of a first Range bin and a first Doppler bin; and
wherein the second 1D CFAR detector, based on the preliminary determination, provides a revised determination at a second time after the first time indicating whether the target is present at the intersection of the first Range bin and the first Doppler bin.

11. The method of claim 10, wherein the preliminary determination has a first accuracy for correctly detecting the target, and the revised determination has a second accuracy for correctly detecting the target, the second accuracy being greater than the first accuracy.

12. The method of claim 10, wherein at the first time, the first cell under test of the first 1D CFAR detector resides at the first intersection of the first Range bin and the first Doppler bin and compares a first cell under test power level to a first training cell power level for the first training cell to make the preliminary determination.

13. The method of claim 10:
wherein at the second time, the second cell under test of the second 1D CFAR detector resides at the intersection of the first Range bin and the first Doppler bin and compares a second cell under test power level to a second training cell power level for the second training cell to make the revised determination.

14. The method of claim 9, wherein respective columns have respective constant Range bin values for the respective columns, and wherein respective rows have respective constant Doppler bin values for the respective rows.

* * * * *